United States Patent [19]

Lipowsky et al.

[11] 4,294,568
[45] Oct. 13, 1981

[54] PROCESS FOR BROACHING OF GROOVES

[75] Inventors: Dieter Lipowsky, Grobenzell; Karl Meyle, Munich, both of Fed. Rep. of Germany

[73] Assignee: Motoren- und Turbinen-Union Munchen GmbH, Munich, Fed. Rep. of Germany

[21] Appl. No.: 98,659

[22] Filed: Nov. 29, 1979

Related U.S. Application Data

[63] Continuation of Ser. No. 875,403, Feb. 6, 1977, abandoned.

[30] Foreign Application Priority Data

Feb. 5, 1977 [DE] Fed. Rep. of Germany ....... 2704812

[51] Int. Cl.³ ...................... B23D 37/04; B23D 41/04
[52] U.S. Cl. ...................................... 409/244; 409/59; 409/268; 409/287
[58] Field of Search ................. 409/268, 287, 59, 244, 409/259, 140, 265

[56] References Cited

U.S. PATENT DOCUMENTS

| | | | |
|---|---|---|---|
| 401,987 | 4/1889 | Waterman | 409/59 |
| 3,259,019 | 7/1966 | Bibbens | 409/59 X |
| 3,293,988 | 12/1966 | Strempel | 409/59 |
| 3,550,504 | 12/1970 | Fulks | 409/265 |
| 3,592,103 | 7/1971 | Brown | 409/140 |
| 3,799,030 | 3/1974 | Schubert | 409/268 X |

FOREIGN PATENT DOCUMENTS

| | | | |
|---|---|---|---|
| 378769 | 2/1940 | Italy | 409/59 |
| 589093 | 1/1978 | U.S.S.R. | 409/244 |

Primary Examiner—William R. Briggs
Attorney, Agent, or Firm—Craig and Antonelli

[57] ABSTRACT

A series of adjacent grooves with mutually equal pitch are produced by a broaching process wherein two adjacent grooves are simultaneously produced in one broaching stroke by means of two broaching tools, one of which performs the preliminary broaching of a first groove and the other of which performs the finish broaching of a second groove which was preliminarly broached on a previous stroke. A preferred device for execution of the process is formed by utilization of a broaching girder which secures a T-shaped supporting strip, and wherein two tools, one a preliminary broaching tool and the other a final broaching tool, are secured in the angular position of the pitch of the grooves to be produced between respective sides of the T-shaped supporting strip and claws of the broaching girder.

12 Claims, 6 Drawing Figures

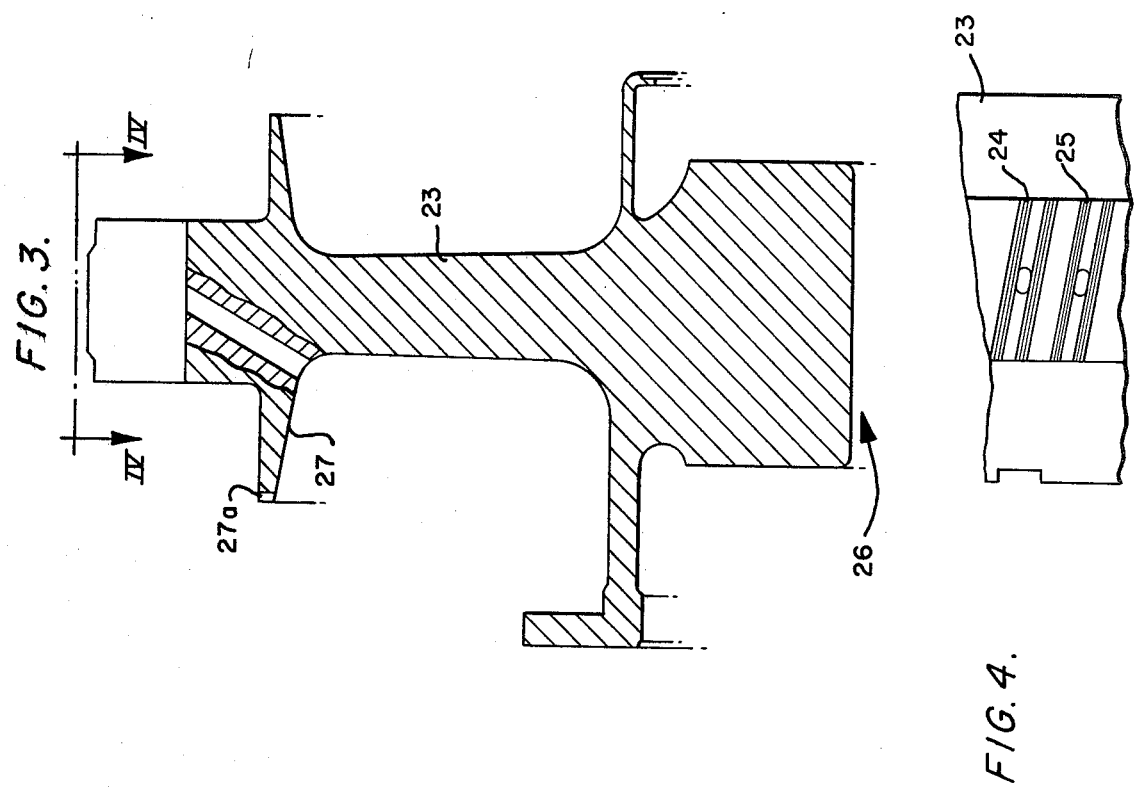
FIG. 3.
FIG. 4.
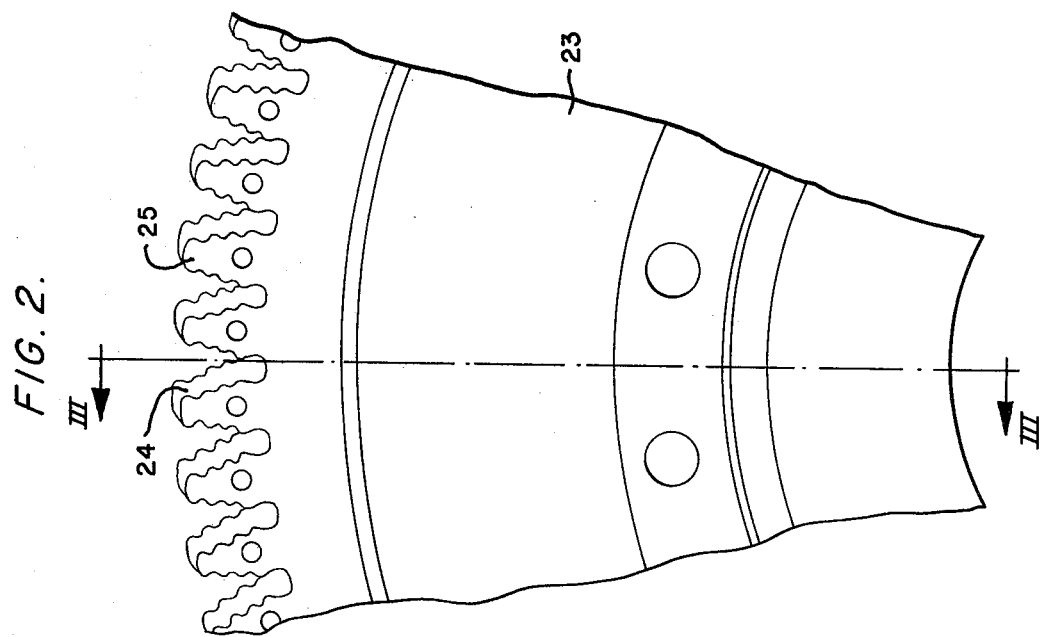
FIG. 2.

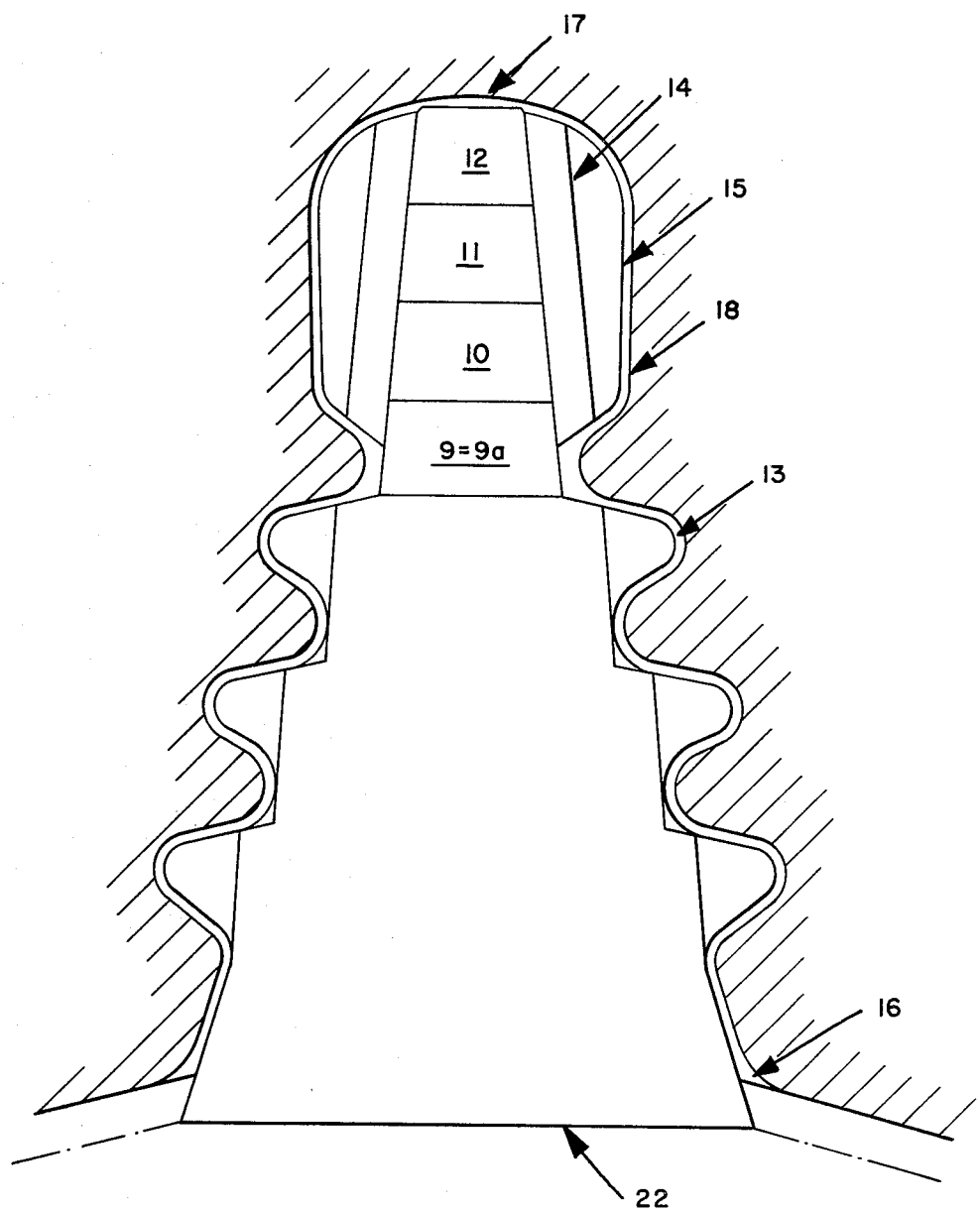

PROCESS FOR BROACHING OF GROOVES

This is a continuation of application Ser. No. 875,403, filed Feb. 6, 1977, now abandoned.

BACKGROUND AND SUMMARY OF THE INVENTION

The invention relates to a process and device for producing a series of adjacent grooves with mutually equal pitch by the broaching of the grooves in the peripheral surface of a body of rotation.

According to known processes, grooves are made in such a way that only one broaching tool works on a groove of the workpiece, said grooves thus being worked individually and in succession, whereby the workpiece, after a groove is broached, is turned further by a pitch t. Because of the generally low broaching speeds which, especially with materials that are highly heat resistant, can be as low as 2 m/min, in this broaching process, a substantially long manufacturing time results which correspondingly raises the cost of production.

Another drawback in the known method is that there is insufficient adaptability of an available machine capacity to what is actually needed. If deep, comparatively complicated grooves are broached, it is necessary to have correspondingly large broaching machines, with long tool strokes and great cutting forces. If, on the other hand, only small grooves with a simple profile and comparatively little material removal are to be broached, they have to be correspondingly small broaching machines which execute a short tool stroke and utilize low cutting forces. However, since the machine set-up has to be designed for the maximum required power, these machines then frequently work in an uneconomical partial load range.

Lastly, it has been necessary thus far, in the case of particular grooves, when the broaching tool is longer than the tool carrier of the broaching machine, to divide the total working of the groove into manufacturing segments, the operating being effected in such a way that with a first part piece of the broaching tool there is a preliminary broaching of the groove, and thereafter this first part piece is exchanged for a second part piece of the broaching tool, with which the preliminary broached groove is finished in a second passage. This process quite particularly requires long manufacturing times and attempts have been made to meet the problems that arise in consideration of the long manufacturing times and in consideration of the poor adaptation possibilities in the available machine capacity, in the case of workpieces with grooves coaxial to the axis of the workpiece, by clamping two workpieces one above the other to reduce projection time. However, because of the greater penetration depth of the two workpieces, the broaching tool chambers for removing material have to be larger, whereby the length of the tool is increased, and again the machining time. For this reason, the present invention has as an object to find a broaching process with which the unacceptably long manufacturing times can be avoided, allowing better utilization of the available machine capacity, no matter whether there are to be deep complex grooves, or those where there is little removal of material.

This problem is solved according to an aspect of the present invention by a process that is characterized by simultaneously broaching two adjacent grooves in one broaching stroke by means of two broaching tools which are clamped at the distance and in the angular position of the pitch of the groove that is to be produced.

An important advantage created by this method according to the present invention resides in the shortening of the machining time, that two grooves can be worked at once. Thus, depending upon the type of profile or step, either there can be final working of two respective grooves in one broaching stroke, or one broaching tool can be a preliminary broaching tool and the other a final broaching tool such that with one broaching stroke, one groove will be preliminarily broached and simultaneously an adjacent one will be finished, whereby only before the first broaching stroke is executed with the two tools is there a first initial groove made in the workpiece.

Another important advantage of the simultaneous broaching of two adjacent grooves according to the present invention consists in that available machine capacity can be better adapted to the actual broaching operation. In this way, only a relatively short work stroke is needed for deep, complicated grooves since the total length of the broaching tool is divided into two partial lengths, leading to the end result that smaller broaching machines can be utilized for such complicated grooves.

A preferred embodiment of the process according to the present invention comprises the following successive steps:

(a) By means of a single clamped preliminary broaching tool, an initial groove is produced in a first broaching stroke, with the desired preliminary broaching profile;

(b) A final broaching tool is clamped next to the preliminary broaching tool at a distance and in the angular position of the pitch of the groove that is to be produced;

(c) The workpiece is adjusted in such a way that the initial groove will correspond to the final broaching tool in height and position of the finished groove;

(d) In a second broaching stroke, simultaneously, with use of both broaching tools, the initial groove is finished, and a second groove is preliminarily broached; and (e) By further turning of the workpiece, for execution of another broaching stroke with the two tools simultaneously, all further grooves of the workpiece are produced.

By working the initial groove in a first broaching stoke with only one broaching tool, the workpiece does not need to be reclamped, but can be finished in a single clamping.

Moreover, the invention relates to a broaching process as described above, in which the direction of the grooves to be produced is not parallel to the direction of the axis of the body of rotation (workpiece) and is characterized in that the initial section of the final broaching tool is made as a compensating tool with which errors of angle present in the preliminarily broached groove can be evened out. Since both the preliminary broaching tool and likewise the final broaching tool are fixed on the same carriage, only the direction of movement of the final broaching tool can coincide with the axial direction of the groove that is to be produced, whereas the direction of movement of the preliminary broaching tool, in this case, describes a small angle with the axial direction of the groove to be preliminarily broached.

The machining errors caused by this can be easily compensated for by the compensating tool portion of the final broaching tool without producing excessive stress on a section of the final broaching tool from it having to cut to an excessive depth of the workpiece. Neither will an inadequate offset remain on the groove, to prevent attainment of the correct final configuration.

The process is specially advantageous in production of retaining grooves for blades on the rotor of a turbine, since here a plurality of grooves must be broached in a material that is difficult to machine in a metal-removing process with low cutting speeds.

In addition to the above-noted process, the invention relates to a device for execution of the above-described process and is characterized, according to a preferred embodiment in that a T-shaped supporting strip is adapted to the broaching tools and the opposed arrangement of the grooves and is fastened on a tool carriage via a broaching girder. The T-shaped support is formed with two angle chambers within a respective one of which the preliminary and final broaching tools are clamped, whereby filler pieces with the metal removal profile of the broaching tool are set in at those places where there is a broaching tool section only on one side of the supporting strip. Because of the T-shaped supporting strip, it is possible to have a very small distance between the two adjacent broaching tools, which is very important when the pitch of the groove to be broached is very narrow. Another advantage of this type of clamping consists in that with conventional broaching machines, the usual tool holders require only slight modification, namely the setting in of the T-shaped support strip, so that operations can be effected with a universal machine. Finally, because of the opposed clamping of the two broaching tools, there is very rigid clamping of the individual tools, since the adjacent tools and its clamping elements can serve as a brace.

These and further objects, features and advantages of the present invention will become more obvious from the following description when taken in connection with the accompanying drawings which show, for purposes of illustration, a single embodiment in accordance with the present invention.

BRIEF DESCRIPTION OF THE DRAWINGS

FIG. 2 is a partial view of a workpiece to be machined according to the process, wherein two finished grooves are illustrated;

FIG. 3 is a section through the workpiece of FIG. 2 along the line III—III;

FIG. 4 is a view of the workpiece in the direction of arrow 4 of FIG. 3;

FIG. 6 is a schematic view of a final broaching tool within a finished groove.

DETAILED DESCRIPTION OF THE INVENTION

Figure 1:
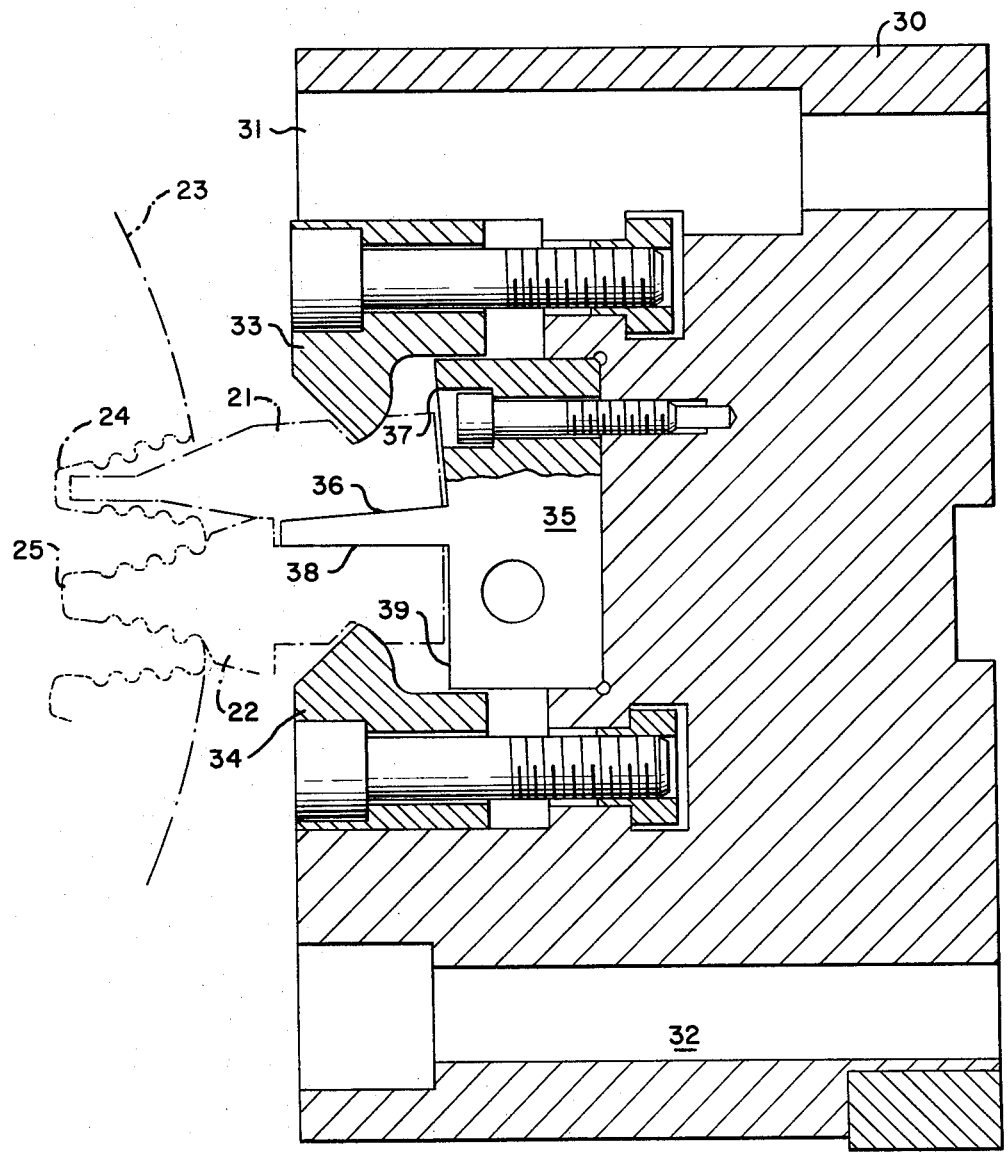
FIG. 1 illustrates a cross-section of a tool holder as it is used for execution of the process of the invention.

A broaching girder 30 is shown in cross-section in FIG. 1. This girder 30 is provided with fastening holes 31 and 32 which enable it to be fixed upon a tool carriage of a conventional broaching machine (not illustrated). One such machine is the Lapointe SRHE manufactured by the Lapointe Machine Tool Company of England. The girder 30 is also provided with a recess within which a T-shaped supporting strip 35 can be set in and clamped. Claws 33 and 34 clamp a preliminary broaching tool 21 and a final broaching tool 22, respectively, against the supporting strip 35 which is provided with surfaces 36-39 which are contoured in inclination and mutual spacing to the position on the grooves to be produced in the workpiece. In FIG. 1, a body of rotation (workpiece) 23 which is to worked is indicated with dot and dash lines. This workpiece 23 can be supported in a rotatable manner by conventional workholders e.g., one such as forms part of the above-noted Lapoint SRHE.

Figure 5:
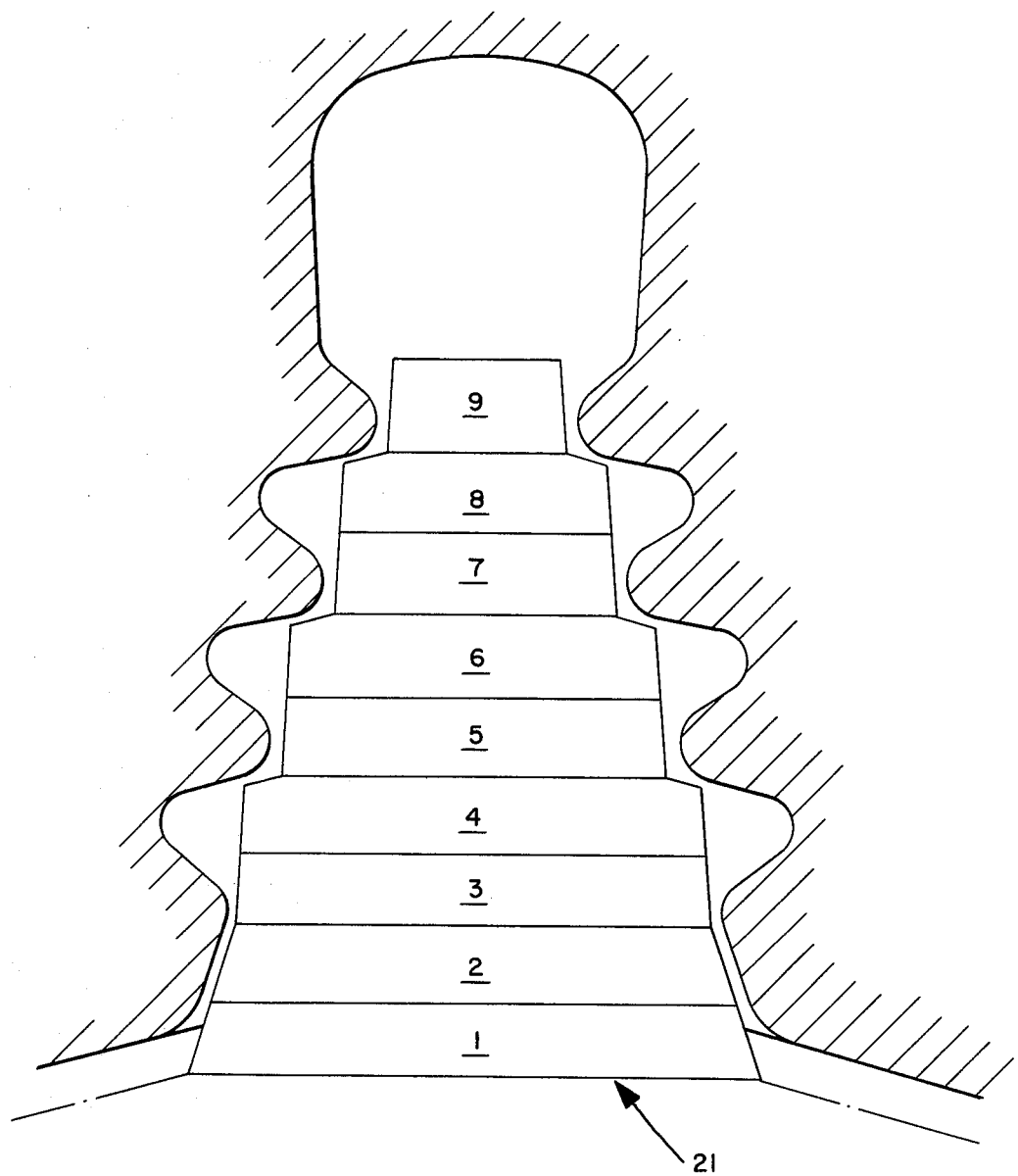
FIG. 5 is a schematic view illustrating a preliminary broaching tool in relation to a finished groove.

In a first process step, only preliminary broaching tool 21 is clamped on the T-shaped supporting strip 35, whereas at the place of the final broaching tool 22 there are filler pieces set in which are gripped by the claw 34 in the same way as final broaching tool 22, and pressed into the angle space of supporting strip 35 against surfaces 38 and 39. The groove designated 25 in FIG. 1 is preliminarily broached by preliminary broaching tool 21 by relative movement between the workpiece and broaching tools in a direction along the length of girder 30. The profile of preliminary broaching tool 21 is shown in FIG. 5, in which the individual sections of preliminary broaching tool 21 are assigned reference numerals 1-9. The cutting edges of broaching tool 21 are themselves of a conventional nature. In this regard, the groove 24 illustrated in FIGS. 1 and 5 is shown in the configuration of a finished groove so as to enable a comparison between the first stage broaching tool profile and the resultant contour produced by the final broaching tool, and is not intended to reflect the shape of the preliminary shaped groove produced by broaching tool 21, as this groove will naturally conform in shape to the preliminary broaching tool 21 which, as shown in FIG. 5, is in the general form of a stepped pyramid.

In a second process step, the filler pieces are removed and the final broaching tool 22 is clamped on supporting strip 35 as indicated in FIG. 1. The body of rotation (workpiece) 23 is turned by the pitch of the grooves in a clockwise direction so that the preliminarily broached groove 25 which was previously at the place of groove 24 is in the position shown in FIG. 1. In a second broaching stroke, the two broaching tools 21 and 22 execute a simultaneous broaching operation, and groove 24 is preliminarily broached while groove 25 is finished. The shape of the final broaching tool 22 is shown in FIG. 6 within a finished groove 24, represented by the line bounded by the hatched area. The individual sections of the tool 22 are designated by the numerals 9a to 18, the cutting edges themselves being of a conventional nature and arranged to form an elongated broach that increases along its length. In the illustrated embodiment, fin-like sections 13 are provided on section 16 to form recesses in the walls of the groove. Additionally, as presented in FIG. 6, the end contour of individual section 9a of final broaching tool 22 is equal to that of individual section 9 of preliminary broaching tool 21 so as to enable this section to serve as a compensating tool.

In FIG. 2, the workpiece (body of rotation) 23 is shown in elevation, and grooves 24 and 25 are illustrated in a finished form. In the section view according to FIG. 3, there is a central bore 26 in the body of rotation 23 which serves for centered receiving of the said body, while a shoulder 27 with a radial groove 27a serves for exact positioning of the body of rotation on the broaching machine.

In the view of FIG. 4, it can be seen that the grooves (24, 25, etc.) are inclined with reference to the axis of rotation (longitudinal axis) of workpiece 23. For this reason, it is not possible to have the direction of advanced preliminary broaching tool 21 coincide precisely with the axial direction of the groove that is to be broached since both tool 21 and 22 are mounted in laterally displaced positions with respect to each other on the same broaching girder. That is, the moving direction of broaching girder 30 does not conform with the longitudinal axis of the grooves to be broached when they are in the preliminary broaching position such that if profile section 9 were made of a size and contour so as to produce a preliminary groove of the same size and angular orientation desired in the finished groove, such a condition could not be maintained upon final broaching due to the above-noted offset. Likewise, if profile 9 is made sufficiently smaller than the desired groove, or if the section 9a of the final broaching tool were made larger than profile 9 (such as a size equivalent to section 10), the risk is run that the chip thickness would become too great and there would be a danger of destroying the finishing tool 22.

This problem is avoided according to the present invention, as indicated above, by forming the profile 9a of final broaching tool 22 the same as the end profile 9 of preliminary broaching tool 21. Thus, this profile section can serve as a special compensating tool to even out angular error (between the intended groove inclination and the above-noted angle of inclination of the groove produced by the preliminary broaching tool not being advanced relative to the workpiece 23 precisely along the intended axial direction of the finished groove) without production of excessively thick metal cuttings per tooth of the broaching tool because, even though profile 9a is identical with profile 9, you nevertheless get a chip removed because of the different moving direction of the profile 9a relative to the existing preliminary groove as a result of the above-noted offset between the preliminary broaching tool 21 and final broaching tool 22.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A process for production of a series of circumferentially adjacent retaining grooves for turbine blades in the peripheral surface of a rotor plate for a turbine engine by broaching, said retaining grooves being inclined with a predetermined pitch relative to the longitudinal axis of the rotor plate and being spaced from each other at a predetermined distance comprised by the simultaneous broaching of two adjacent retaining grooves in one broaching stroke by means of two broaching tools positioned relative to each other at the distance and in the angular position of the pitch of the grooves that are to be produced.

2. A process for production of a series of circumferentially adjacent grooves in the peripheral surface of a rotatable workpiece comprising the steps of:

(a) broaching a first partially formed groove with a preliminary broaching tool;
    (b) repositioning the workpiece relative to the preliminary broaching tool; and
    (c) in all subsequent broaching steps, simultaneously broaching a further partially formed groove with said preliminary broaching tool and finish broaching a partially formed groove that was broached in a preceding step with a finishing broaching tool that is larger than said preliminary broaching tool in at least one cutting dimension.

3. A process for production of a series of circumferentially adjacent grooves in the peripheral surface of a rotatable workpiece by broaching, said grooves being inclined with a predetermined pitch relative to the longitudinal axis of the workpiece and being spaced from each other at a predetermined distance, comprised by the simultaneous broaching of two adjacent grooves in one broaching stroke by means of two broaching tools positioned relative to each other at the distance and in the angular position of the pitch of the grooves that are to be produced.

4. A process according to claim 1 or 2, characterized in that one of the broaching tools is a preliminary broaching tool, the other a final broaching tool, and in that with each broaching stroke one groove is preliminarily broached and simultaneously the adjacent groove is finished, and wherein the initial broaching stroke with the two tools is preceded by the step of forming a first initial preliminarily broached groove in the workpiece.

5. A process according to claim 4, characterized by the following successive process steps:

(a) said first initial groove is formed by means of one singly clamped preliminary broaching tool, in a first broaching stroke,
    (b) next to the preliminary broaching tool, a finishing broaching tool is clamped at the distance and in the angular position of the pitch of the grooves that are to be produced,
    (c) the workpiece is so positioned that the initial groove corresponds in height and position of the finished profile to that of the finishing broaching tool,
    (d) in a second broaching stroke, using the two broaching tools, the initial groove is finished and a second groove is preliminarily broached,
    (e) by turning of the workpiece by an amount equal to the pitch desired for the grooves, with each respective further broaching stroke all of the rest of the grooves are preliminarily produced and finished on the workpiece by simultaneous use of both tools.

6. A process according to claim 5, in which the steps whereby the grooves are finished are performed using a finishing tool having a compensating section that corrects errors in the angle of inclination created in the preliminarily broached grooves.

7. A process according to claims 3 or 1 or 2, in which steps whereby the grooves are finished are performed using a finishing broaching tool having a compensating section that corrects errors in the angle of inclination created in the preliminarily broached grooves.

8. A method for producing a series of adjacent grooves in a peripheral surface of a rotatable workpiece according to claim 3, wherein the step of simultaneous broaching is preceded by the step of clamping one of two broaching tools in each of two chambers formed between surfaces of a T-shaped supporting strip that are contoured to receive said broaching tools, and fastened on a tool carriage of a groove broaching device, and a broaching girder forming part of said tool carriage.

9. A groove broaching device for producing a series of circumferentially adjacent grooves of equal pitch in the curved peripheral surface of a rotatable workpiece comprising a T-shaped supporting strip having surfaces contoured to receive two broaching tools, means to fasten said supporting strip on a tool carriage including a broaching girder, two tool receiving chambers being formed between said girder and said surfaces of the T-shaped strip, and means to clamp a broaching tool in each of said chambers.

10. A device according to claim 9, wherein one of said two broaching tools is a preliminary broaching tool having cutting edges forming an initial cut of a first configuration and the other is a finishing broaching tool having cutting edges for forming a final cut of a second larger configuration.

11. A device according to claim 10, wherein said surfaces of said T-shaped supporting strip orient said two broaching tools at a predetermined distance and angular position for producing, upon a single stroke of said device, a pair of adjacent grooves.

12. A device according to claim 11, wherein the end profile of the preliminary broaching tool and the corresponding portion of the finishing broaching tool are equal, such that said portion of the finishing broaching tool serves as a compensating tool which corrects for angular errors produced by said preliminary broaching tool.

* * * * *